United States Patent
Darak et al.

(10) Patent No.: US 11,540,134 B1
(45) Date of Patent: Dec. 27, 2022

(54) SYSTEMS AND METHODS FOR PROACTIVE CALL SPAM/SCAM PROTECTION USING NETWORK EXTENSIONS

(71) Applicant: NORTONLIFELOCK INC., Tempe, AZ (US)

(72) Inventors: Anand Darak, Maharashtra (IN); Sharad Mhaske, Maharashtra (IN)

(73) Assignee: Gen Digital Inc., Tempe, AZ (US)

( * ) Notice: Subject to any disclaimer, the term of this patent is extended or adjusted under 35 U.S.C. 154(b) by 236 days.

(21) Appl. No.: 17/093,289

(22) Filed: Nov. 9, 2020

(51) Int. Cl.
| | | |
|---|---|---|
| *G06Q 20/42* | (2012.01) | |
| *H04W 12/121* | (2021.01) | |
| *G06Q 30/00* | (2012.01) | |
| *G06Q 20/40* | (2012.01) | |
| *G06Q 20/32* | (2012.01) | |
| *H04W 12/082* | (2021.01) | |
| *H04W 12/10* | (2021.01) | |
| *G06Q 50/00* | (2012.01) | |

(52) U.S. Cl.
CPC ........ *H04W 12/121* (2021.01); *G06Q 20/325* (2013.01); *G06Q 20/40* (2013.01); *G06Q 20/42* (2013.01); *G06Q 30/0185* (2013.01); *H04W 12/082* (2021.01); *H04W 12/10* (2013.01); *G06Q 50/01* (2013.01)

(58) Field of Classification Search
USPC ...................................... 455/41; 705/1.1, 35
See application file for complete search history.

(56) References Cited

U.S. PATENT DOCUMENTS

| | | | |
|---|---|---|---|
| 10,455,085 B1* | 10/2019 | Roundy ................ | H04W 12/12 |
| 10,594,736 B1* | 3/2020 | Amit ................... | H04L 63/1433 |
| 10,958,784 B1* | 3/2021 | Way ..................... | G06Q 20/401 |
| 2005/0053215 A1* | 3/2005 | Bedingfield ........ | H04M 3/2281 379/210.02 |
| 2009/0147936 A1* | 6/2009 | Won ........................ | H04M 3/38 379/201.02 |
| 2010/0332607 A1* | 12/2010 | Seon ..................... | H04L 51/212 709/206 |
| 2021/0192527 A1* | 6/2021 | Li .......................... | G06Q 20/42 |

\* cited by examiner

*Primary Examiner* — William E Rankins
(74) *Attorney, Agent, or Firm* — Greenberg Traurig, LLP

(57) ABSTRACT

The disclosed computer-implemented method for proactive call spam/scam protection may include intercepting network traffic by the at least one processor employing a network extension feature of an operating system of a computing device. The method may additionally include capturing, by the at least one processor employing the network extension feature, a phone number in the network traffic. The method may also include comparing, by the at least one processor employing the network extension feature, the phone number to a plurality of entries in a spam/scam repository. The method may further include performing, by the at least one processor, a security action in response to the comparison. Various other methods, systems, and computer-readable media are also disclosed.

20 Claims, 7 Drawing Sheets

SYSTEMS AND METHODS FOR PROACTIVE CALL SPAM/SCAM PROTECTION USING NETWORK EXTENSIONS

BACKGROUND

Undesirable calls are a persistent problem for users of mobile devices, such as smart phones and tablets. These calls can be received through network traffic, such as traffic of messaging apps and social apps. Such undesirable calls include spam calls and scam calls.

Spam calls are a form of unwanted communication in which messages are distributed in bulk and in most cases unsolicited, which means they occur without any prior request. Examples may include telemarketers, who are typically live agents hoping to sell their legitimate (albeit unsolicited) services. Another variant of spam call is the robocall, which delivers a pre-recorded voice statement with the same goal of a sale. Robocalls are illegal without prior consent.

Scam calls are a form of fraudulent activity with the goal of stealing money or your information. Phone scams often present a bargain for merchandise, or something completely free (such as a free prize or winning a contest). Others demand payment for actions that victims have not performed, or services not ordered, including missing jury duty or payments on an outstanding debt like unpaid taxes or utility bills.

Techniques for identifying unwanted calls often exploit call pattern features of such calls. For example, spam call patterns exhibit unique characteristics that allow sophisticated heuristic algorithms to identify spam calls. In contrast, call patterns for scam calls are different because criminals use one number for a short duration of time and quickly discard it. As a result, scam calls are harder to identify due to their short lifespans. For this reason, most anti-spam solutions that rely on user reports are ineffective against scam callers. Solutions for detecting scam calls rely on advanced heuristics-based call pattern analysis and machine learning algorithms.

Techniques for preventing unwanted calls are beginning to be implemented on many mobile devices. However, closed platform operating systems, such as the iOS operating system, present challenges to developers trying to implement these techniques on these mobile devices. Closed platforms lack provisions for open application programming interfaces (API), flexible scope to use software for purposes other than as intended, open source code that can be edited by users to tailor it to their needs, free adoptability, or editing functionality of specific features. With a closed platform, developers are not permitted to side-step the app store in distributing their applications. The present disclosure, therefore, identifies and addresses a need for systems and methods for call spam/scam protection on mobile devices running closed platform operating systems.

SUMMARY

As will be described in greater detail below, the present disclosure describes various systems and methods for proactive call spam/scam protection.

In some examples, a method for proactive call spam/scam protection may include intercepting network traffic by at least one processor employing a network extension feature of an operating system of a computing device. In some of these examples, the network traffic includes at least one of messaging application traffic or social application traffic. The method may additionally include capturing, by the at least one processor employing the network extension feature, a phone number in the network traffic. The method may also include comparing, by the at least one processor employing the network extension feature, the phone number to a plurality of entries in a spam/scam repository. The method may further include performing, by the at least one processor, a security action in response to the comparison.

In some examples of the method, capturing the phone number includes capturing the phone number for a payment transaction in the network traffic. In such examples, the security action includes preventing the payment transaction. In additional or alternative examples, capturing the phone number includes capturing the phone number for a call in the network traffic. In such examples, the security action includes employing the network extension feature to deny a network connection for the call.

In some examples of the method, the network extension feature is implemented using an iOS operating system network extension framework. In some of these examples, the network extension feature is implemented as a content filter of the iOS network extension framework. In some of these examples, the method further includes receiving, by a filter data provider of the content filter, configuration information that includes the spam/scam repository.

In additional or alternative examples of the method, the security action further includes communicating a prompt to a user of the computing device and receiving a user input indicating a user selection responsive to the prompt. In such examples, denial of the network connection occurs in response to the user selection. In some of these examples, the prompt informs the user that the call may be a spam or scam call and prompts the user to make the user selection to allow or prevent the call. In some of these examples, the security action further includes making a determination that the user selection indicates that the user wishes to prevent the call. In these examples, denial of the network connection occurs in response to the determination that the user wishes to prevent the call.

In one embodiment, a system for proactive call spam/scam protection may include at least one physical processor employing a network extension feature of an operating system and physical memory that includes computer-executable instructions. When executed by the physical processor, the instructions cause the physical processor to intercept network traffic and capture a phone number in the network traffic. The instructions also cause the physical processor to compare the phone number to a plurality of entries in a spam/scam repository and perform a security action in response to the comparison.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to employ a network extension feature to intercept network traffic and capture a phone number in the network traffic. The instructions also cause the physical processor to employ the network extension feature to compare the phone number to a plurality of entries in a spam/scam repository and perform a security action in response to the comparison.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
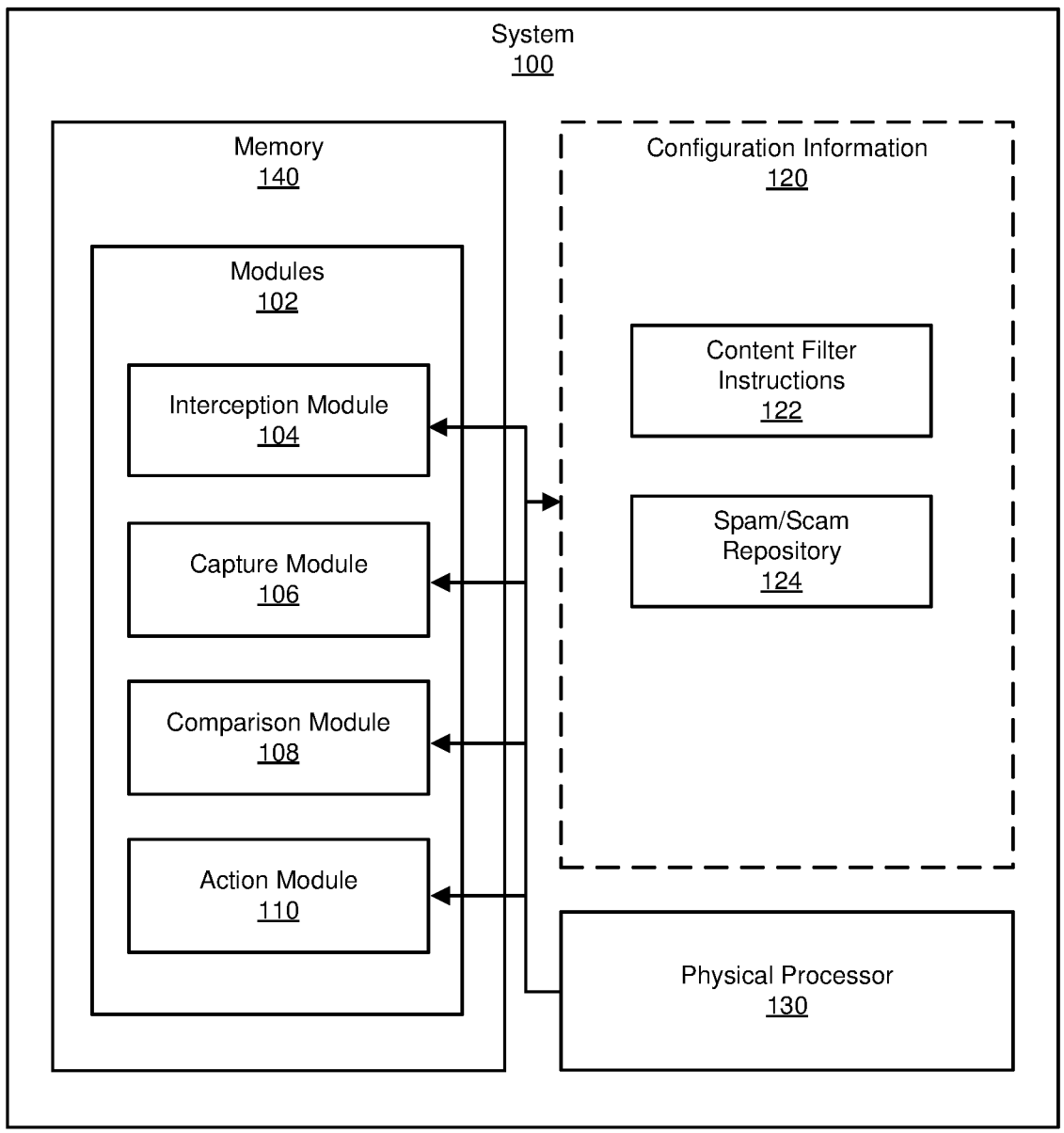
FIG. 1 is a block diagram of an example system for proactive call spam/scam protection using network extensions.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for proactive call spam/scam protection using network extensions. According to the disclosed solutions, a processor may employ the network extension feature of an operating system of a computing device to intercept network traffic and capture a phone number in the network traffic. The processor may additionally employ the network extension feature to compare the phone number to a plurality of entries in a spam/scam repository and perform a security action in response to the comparison. In some implementations, the security action may include preventing a payment transaction to a scam phone number and/or employing the network extension feature to deny a network connection for the call. In some implementations, the security action may also include displaying a prompt to the user that notifies the user of potential spam and/or scam and prompts the user to make a user selection to allow or deny a payment and/or call.

Combining proactive call spam/scam protection with network extension provides a solution to the challenge of implementing proactive spam/scam protection on closed platform operating systems, such as the iOS operating system. Additionally, the solution provides the capability to both detect spam/scam calls and prevent such calls. Also, the protection can be enhanced to detect and prevent calls that arrive or are initiated as part of messaging apps and social apps. Further, the solution provides the capability to detect scam phone numbers designated to receive an outgoing payment transaction and prevent the payment transaction. As a result, the computing device is improved by proactively protecting users from spam/scam calls and/or scam payment transactions.

In some implementations, the proactive call spam/scam protection uses the network extension framework of the iOS operating system. With the iOS network extension framework, developers can customize and extend the core networking features of iOS. Specifically, developers can: change a system's Wi-Fi configuration; integrate an app with a hotspot network subsystem (Hotspot Helper), create and manage virtual private network (VPN) configurations, using built-in VPN protocols (Personal VPN) or a custom VPN protocol; implement an on-device content filter; and create and manage system-wide DNS configurations, using the built-in DNS protocols or a custom on-device DNS proxy. In some implementations, the proactive call spam/scam protection is implemented as a content filter of the iOS network extension framework.

An on-device network content filter may examine user network content as it passes through the network stack and determines if that content should be blocked or allowed to pass on to its destination. The content filter of the iOS network extension framework is intended to allow developers to create a content filter and sell it to organizations, like schools and businesses, that want to prevent users from accessing specific Internet content. The intended use of the content filter is to prevent users from accessing certain web pages. Thus, repurposing this content filter to provide proactive call spam/scam protection is an innovative use of the content filter.

A content filter may consist of two providers that work in close cooperation. A filter data provider may receive user network content and examines that content to determine whether to block or allow it. A filter control provider may pass configuration information to the filter data provider to allow that provider to do its job. This separation exists to guarantee user privacy. The filter data provider runs in a very restrictive sandbox that prevents user network content from escaping that provider. The filter control provider has a less restrictive sandbox but lacks access to user network content. By combining these providers, the content filter has access to the network but cannot use that access to export user network content.

In operation, the filter control provider may download a set of filtering rules and save them to a shared app group. The filter data provider has read-only access to that app group, allowing it use those rules to filter content but still preventing it from exporting user network content. Content filter providers are only supported on supervised iOS devices.

Figure 2:
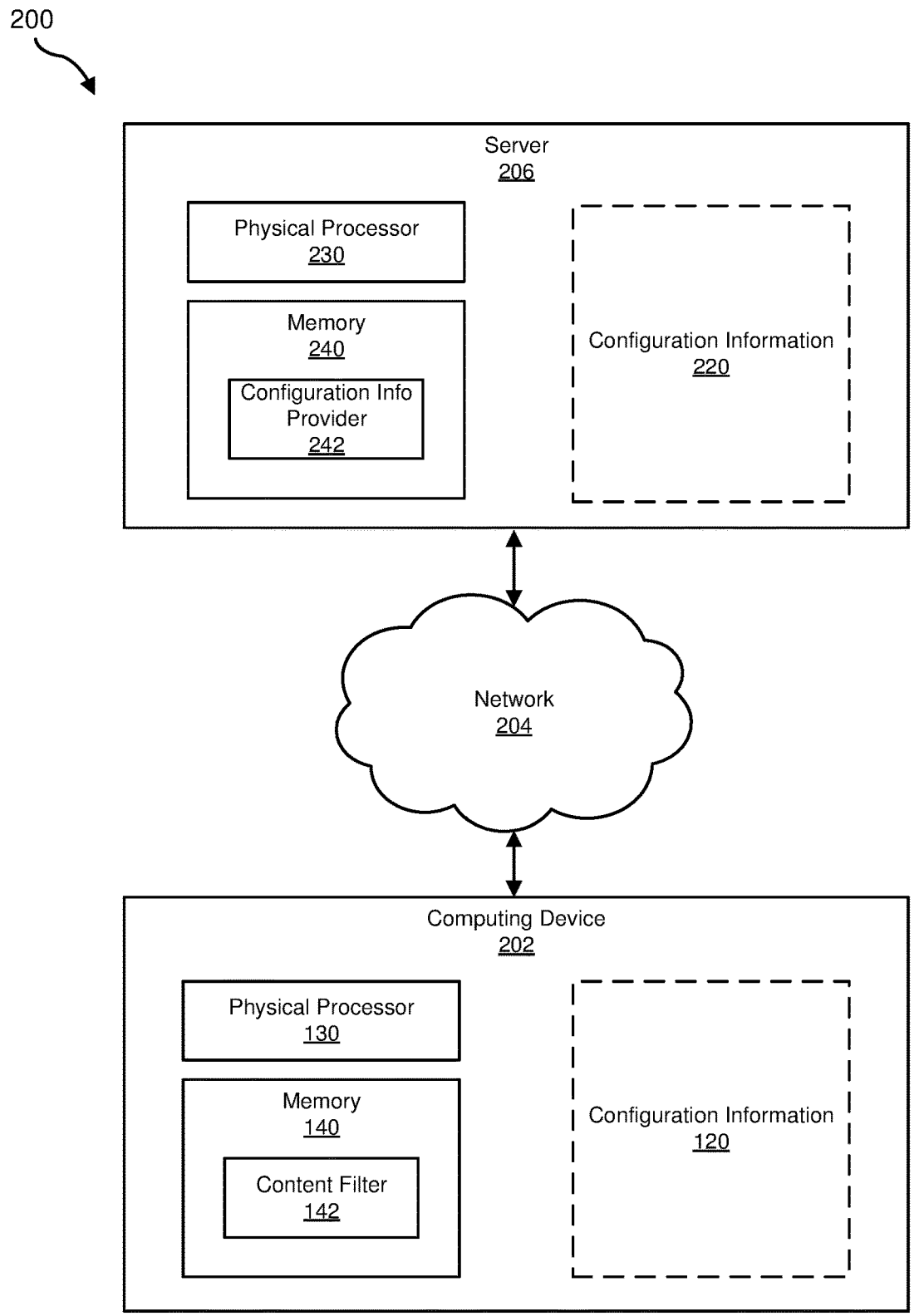
FIG. 2 is a block diagram of an additional example system for proactive call spam/scam protection using network extensions.

The following will provide, with reference to FIGS. 1-2, detailed descriptions of example systems for proactive call spam/scam protection. Detailed descriptions of corresponding computer-implemented methods will also be provided in connection with FIG. 3. Detailed descriptions of implementations that prompt users to take actions will be provided in connection with FIGS. 4 and 5. In addition, detailed descriptions of an example computing system and network architecture capable of implementing one or more of the embodiments described herein will be provided in connection with FIGS. 6 and 7, respectively.

FIG. 1 is a block diagram of an example system 100 for proactive call spam/scam protection using network extensions. As illustrated in this figure, example system 100 may include one or more modules 102 for performing one or more tasks. As will be explained in greater detail below, modules 102 may include an interception module 104, a capture module 106, a comparison module 108, and an action module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to provide proactive call spam/scam protection. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

As illustrated in FIG. 1, example system 100 may also include one or more instances of stored information, such as configuration information 120. Configuration information 120 generally represents any type or form of information that configures physical processor to perform operations that provide proactive call spam/scam protection using a network extension feature of an operating system. In one example, configuration information 120 may include content filter instructions 122 and a scam/spam repository of phone numbers used for spam calls and/or scam calls.

In operation, content filter instructions 122 cause physical processor 130 to implement modules 102. For example, interception module 104 intercepts network traffic and capture module 106 captures a phone number in the network traffic. Advantageously, intercepting network traffic allows the proactive call spam/scam protection to be extended to traffic of messaging apps, social apps, payment apps (e.g., banking apps, ZELLE, VENMO, PAYPAL, etc.), and ecommerce apps (e.g., AMAZON, EBAY, etc.). Additionally, comparison module 108 compares the phone number to a plurality of entries in the spam/scam repository 124, and action module performs a security action in response to the comparison. This security action may include preventing a payment transaction to a scam phone number and/or employing the network extension feature to deny a network connection for a spam/scam call. In some implementations, the security action may also include displaying a prompt to the user that notifies the user that the transaction is to a potential scammer or a call is a potential spam/scam call, and prompts the user to make a user selection to allow or prevent the payment transaction and/or allow or deny the call.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to provide proactive call spam/scam protection using network extensions. For example, and as will be described in greater detail below, one or more of modules 102 may cause computing device 202 and/or server 206 to employ a network extension feature to intercept network traffic, capture a phone number in the network traffic, compare the phone number to a plurality of entries in the spam/scam repository, and perform a security action in response to the comparison.

In some implementations, server 206 has a configuration information provider 242 that provides configuration information to computing device 202 over network 204. For example, the server may use heuristics and/or machine learning to develop and regularly update a scam/spam repository that is included in the configuration information 220. Alternatively or additionally, server 206 may receive contents of the spam/scam repository from a service that provides this type of information. Physical processor 230 may implement configuration information provider 242 in memory 240 to periodically provide the configuration information to a filter control provider of a content filter 142 implemented on the computing device 202. The content filter provider may then share this configuration information 120 by storing it in a shared location to which a data filter provider of the content filter 142 has read only access. Thus, the network extension feature may be implemented as a content filter of an iOS operating system network extension framework, and a filter data provider of the content filter may receive configuration information that includes the spam/scam repository. The entries in the spam/scam repository may be labeled as scam or spam to facilitate different types of security actions, such as preventing a payment transaction to a scam phone number but not to a spam phone number.

Computing device 202 generally represents any type or form of computing device capable of reading computer-executable instructions. For example, the computing device may be a mobile device, such as a smartphone or tablet. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of providing configuration information to computing device 202. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Configuration information 120 generally represents any type or form of instructions and information capable of causing physical processor 130 to provide proactive call spam/scam protection using network extensions. Examples of configuration information include, without limitation, a spam/scam repository and instructions that cause the physical processor 130 to implement modules 102 as previously described.

Figure 3:
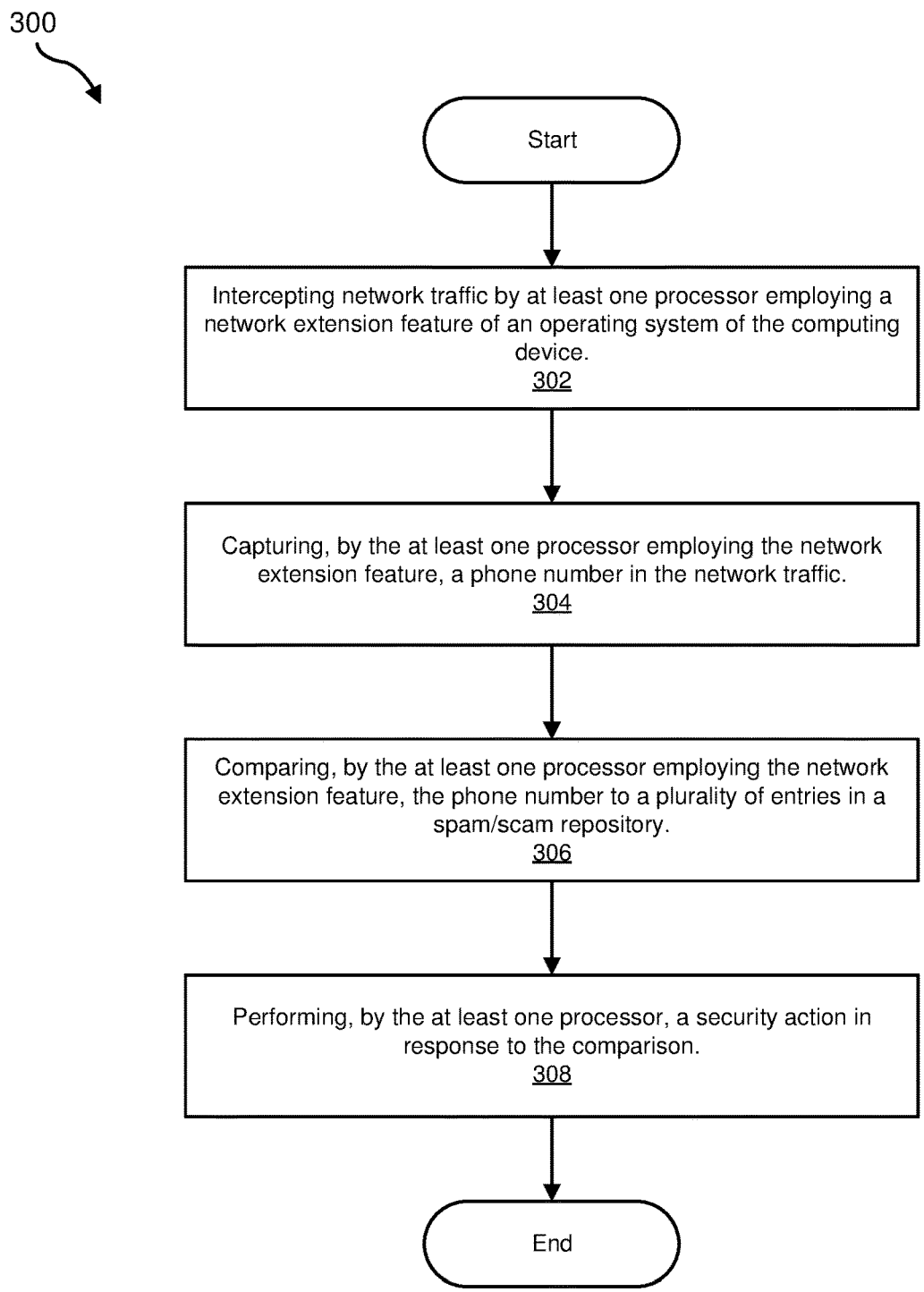
FIG. 3 is a flow diagram of an example method for proactive call spam/scam protection using network extensions.

FIG. 3 is a flow diagram of an example computer-implemented method 300 for proactive call spam/scam protection. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may provide proactive spam/scam protection using network extensions. For example, interception module 104 may, as part of computing device 202 in FIG. 2, use a network extension feature to intercept network traffic. Advantageously, intercepting network traffic allows the proactive call spam/scam protection to be extended to traffic of various apps, such as messaging apps, social apps, banking apps, ecommerce apps, etc.

The term "network traffic," as used herein, generally refers to data moving across a network at any given time. Network data is often organized into packets, the smallest, fundamental units of data passed along a network. Network traffic data is broken into these packets for transmission and reassembled at the destination. Examples of network traffic include, without limitation, web browser traffic, messaging app traffic, social app traffic, banking app traffic, and ecommerce app traffic.

The term "web browser," as used herein, generally refers to a software application for accessing information on the World Wide Web. When a user requests a web page from a particular website the web browser retrieves the necessary content from a web server and then displays the page on the user's device. A web browser is not the same thing as a search engine, though the two are often confused. For a user, a search engine is just a website that provides links to other websites. However, to connect to a website's server and display its web pages, a user must have a web browser installed. Thus, web browser traffic may include search queries and/or search results. Examples of web browsers include, without limitation, GOOGLE CHROME, SAFARI, FIREFOX, and MICROSOFT EDGE.

The term "messaging app," as used herein, generally refers to apps and platforms that enable instant messaging. Many such apps have developed into broad platforms enabling status updates, chatbots, payments, and conversational commerce (e-commerce via chat). They are normally centralized networks run by the servers of the platform's operators, unlike peer-to-peer protocols like XMPP. Some examples of popular messaging apps include, without limitation, WhatsApp, Facebook messenger, China's WeChat and QQ Messenger, Telegram, Viber, Line, and Snapchat. Certain apps have emphasis on certain uses—for example Skype focuses on video calling, Slack focuses on messaging and file sharing for work teams, and Snapchat focuses on image messages. Some social networking services offer messaging services as a component of their overall platform, such as Facebook's Facebook Messenger, while others have a direct messaging function as an additional adjunct component of their social networking platforms, like Instagram, Reddit, TikTok, and Twitter, either directly or through chat rooms.

The term "social app," as used herein, generally refers to communication and interactive tools often based on the Internet. Communication tools typically handle the capturing, storing and presentation of communication, usually written but increasingly including audio and video as well. Interactive tools handle mediated interactions between a pair or group of users. They focus on establishing and maintaining a connection among users, facilitating the mechanics of conversation and talk. Social app software generally refers to software that makes collaborative behavior, the organization and molding of communities, self-expression, social interaction and feedback possible for individuals. Another element of such software is that it allows for the structured mediation of opinion between people, in a centralized or self-regulating manner.

The term "banking app," as used herein, generally refers to a mobile app that allows users to access the details of their bank accounts and complete transactions directly from their mobile devices. Based on the bank being accessed, users can complete a variety of actions via banking app. For example, users may make payment transactions to accounts designated by phone numbers and/or email addresses using supported services like ZELLE.

The term "e-commerce app," as used herein, generally refers to a mobile application that allows a user of a mobile device to engage in e-commerce. E-commerce (electronic commerce) is the activity of electronically buying or selling products on online services or over the Internet. Electronic commerce draws on technologies such as mobile commerce, electronic funds transfer, supply chain management, Internet marketing, Online transaction processing, electronic data interchange, inventory management systems, and automated data collection systems. Examples of e-commerce apps include, without limitation, AMAZON and EBAY.

The systems described herein may perform step 302 in a variety of ways. In one example, a filter data provider of a content filter receives user network content as it passes through the network stack and delays downstream delivery of the network content until a decision is made whether to allow or deny it. Network content may be delivered to the filter data provider in the form of NEFilterFlow objects, which are an abstract base class for types that represent flows of network data. Each of these objects corresponds to a network connection opened by an application running on the device. The filter data provider can choose to pass or block the data when it receives a new flow, or it can ask the system to see more of the flow's data in either the outbound or inbound direction before making a pass or block decision. Therefore, step 302 may include receiving such objects for a new flow and/or in response to a request for more of the flow's data.

As illustrated in FIG. 3, at step 304 one or more of the systems described herein may provide proactive spam/scam protection using network extensions. For example, capture module 106 may, as part of computing device 202 in FIG. 2, use a network extension feature to capture a phone number in the network traffic. The captured phone number may be a phone number of an incoming call, an outgoing call, or an outgoing payment transaction.

The term "phone number," as used herein, generally refers to a number assigned to a telephone line for a specific phone or set of phones (as for a residence) that is used to call that phone. Examples of phone numbers include, without limitation, sequences of digits assigned to a fixed-line telephone subscriber station connected to a telephone line or to a wireless electronic telephony device, such as a radio telephone or a mobile telephone, or to other devices for data transmission via the public switched telephone network (PSTN) or other public and private networks. Other examples of phone numbers include aliases for phone numbers, such as email addresses and/or other contact information that may be associated with or correspond to one or more phone numbers.

The term "incoming call," as used herein, generally refers to an audio and/or video call that is being received by the computing device. Examples of incoming calls include, without limitation, spam calls and scam calls initiated by telemarketers and criminals using devices other than the computing device. Incoming calls may be contrasted with "outgoing calls," which are calls originating from the computing device and are typically initiated by a user of the computing device.

The term "payment transaction," as used herein, generally refers to an e-payment (electronic payment) for goods or services on the Internet. E-payments include all financial operations using electronic devices, such as computers, smartphones or tablets. Such payment transactions can be made to a recipient identified by a phone number or related information, such as an email address and/or contact information associated with one or more phone numbers.

The systems described herein may perform step 304 in a variety of ways. In one example, a filter data provider of a content filter analyzes user network content as it passes through the network stack and identifies phone numbers. This analysis may be performed for individual NEFilterFlow objects. The data filter provider can ask the system to see more of the flow's data making a pass or block decision. Therefore, step 304 may include analyzing such objects for a new flow and/or in response to a request for more of the flow's data.

As illustrated in FIG. 3, at step 306, one or more of the systems described herein may provide proactive spam/scam protection using network extensions. For example, comparison module 108 may, as part of computing device 202 in FIG. 2, use a network extension feature to compare the phone number to a plurality of entries in the spam/scam repository 124.

The systems described herein may perform step 306 in a variety of ways. In one example, a filter data provider of a content filter, having already captured a phone number at step 304, may compare the captured phone number to phone numbers stored as entries in the spam/scam repository 124. If one of these comparisons reveals that the captured number matches an entry of the spam/scam repository, then the filter data provider may determine that a match exists. Alternatively or additionally, It is envisioned that the scam/spam repository entries may include aliases for phone numbers, such as email addresses, vendor names, mailing addresses, and/or other contact information. Thus, step 304 may refer to the contents of the scam/spam repository and look for one or more aliases of the phone numbers in the network traffic. Step 306 may thus be accomplished contemporaneously with the capture of the phone number in step 304.

As illustrated in FIG. 3, at step 308, one or more of the systems described herein may provide proactive spam/scam protection using network extensions. For example, action module 110 may, as part of computing device 202 in FIG. 2, use a network extension feature to perform a security action in response to the comparison made at step 306. In some examples, the security action may include, in response to determining that a match exists to a scam phone number, preventing a payment transaction directed to the scam phone number or alias thereof. In some implementations, the security action may also include displaying a prompt to the user that notifies the user that the designated recipient of a payment transaction is a potential scammer and prompts the user to make a user selection to allow or prevent the transaction. Alternatively or additionally, the security action may include employing the network extension feature to deny a network connection for an incoming or outgoing call in response to determining that a match exists. In some implementations, the security action may also include displaying a prompt to the user that notifies the user that the call is a potential spam/scam call and prompts the user to make a user selection to allow or deny the call.

The term "network connection," as used herein, generally refers to a session in which data is streamed (transmitted & received in-order). Sessions have a set-up and a tear-down phase where a channel (which can be virtual) is created and destroyed. Alternatively or additionally, two hosts may be considered connected, without limitation, if they and intervening network devices have the necessary open data structures to send and receive messages to each other.

The term "prompt," as used herein, generally refers to an input prompt that corresponds to a symbol that appears on an active display to indicate that the computing device is ready to receive input. Such prompts may convey information and provide labeled controls for making specific user selections. Examples of such prompts include, without limitation, messages that display on touch screens of mobile devices and that disappear once the user makes a user selection by touching a labeled control displayed in concert with the message.

The systems described herein may perform step 308 in a variety of ways. In one example, a content filter may prevent downstream delivery of a flow containing the phone number and abort the network connection for the call or transaction. Alternatively or additionally, the content filter may deny establishment of a connection requested by the flow to establish the call or transaction. Thus, the content filter does not merely detect spam/scam calls and/or scam transactions, but also prevents the calls and/or transactions, and it may extend this functionality to transactions in banking app traffic and/or e-commerce app traffic as well as calls in messaging app traffic and/or social app traffic.

Figure 4:
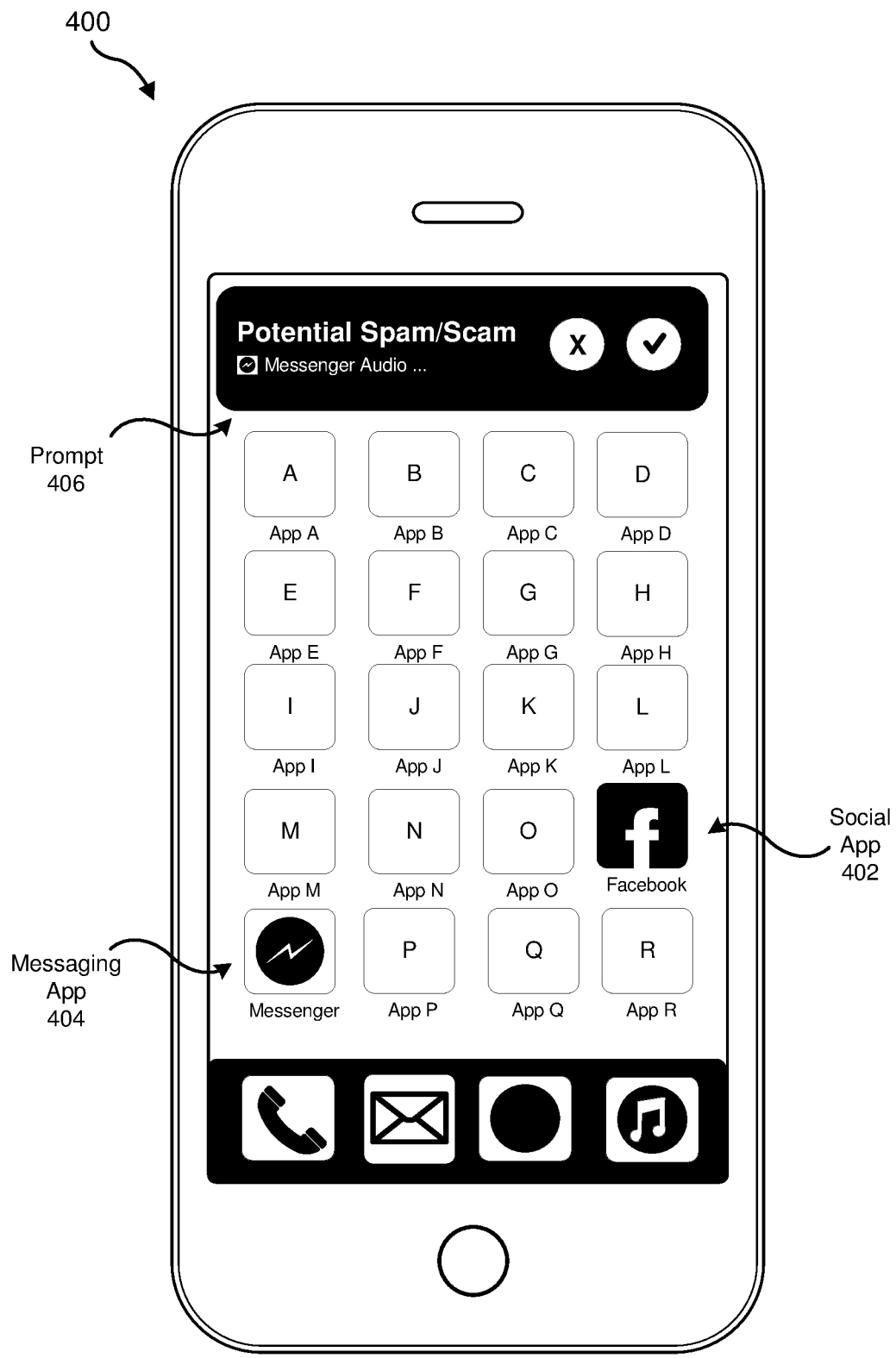
FIG. 4 is a graphical illustration of a mobile device user interface displaying a prompt according to some implementations of the call spam/scam protection using network extensions.

As illustrated in FIG. 4, a computing device 400, in this example a smart phone, has an active display showing numerous apps, such as APP A to APP R, plus a social app 402 and a messaging app 404. The active display also shows display of a prompt 406 as part of the previously described security action. The prompt, which may be displayed by the filter data provider of the content filter, includes a textual message that notifies a user that an incoming call arriving over the messaging app 404 is potentially a spam/scam call. The prompt 406 also provides labeled controls that prompt the user to make a user selection whether to allow or deny the call. The user may select one of these controls by touching the control, and the filter data provider may receive this user selection. Thus, when the user selects to deny the call, the content filter may deny a network connection for the incoming call. Alternatively, if the user selects to allow the call, then the content filter may allow the network connection for the incoming call.

Although the prompt illustrated in FIG. 4 is for an incoming call, it should also be understood that such a prompt may be displayed for an outgoing call. For example, a user may have received a threatening letter, emailed image, or other communication from a scammer demanding that the user telephone the scammer. A scam phone number may thus be detected in an outgoing call and a prompt displayed informing the user that the destination phone number is a potential scammer. This prompt may also provide controls that the user may select to allow or deny the call. The network extension feature may be used to deny a network connection for the outgoing call in response to the user selection of the control to deny the outgoing call.

Figure 5:
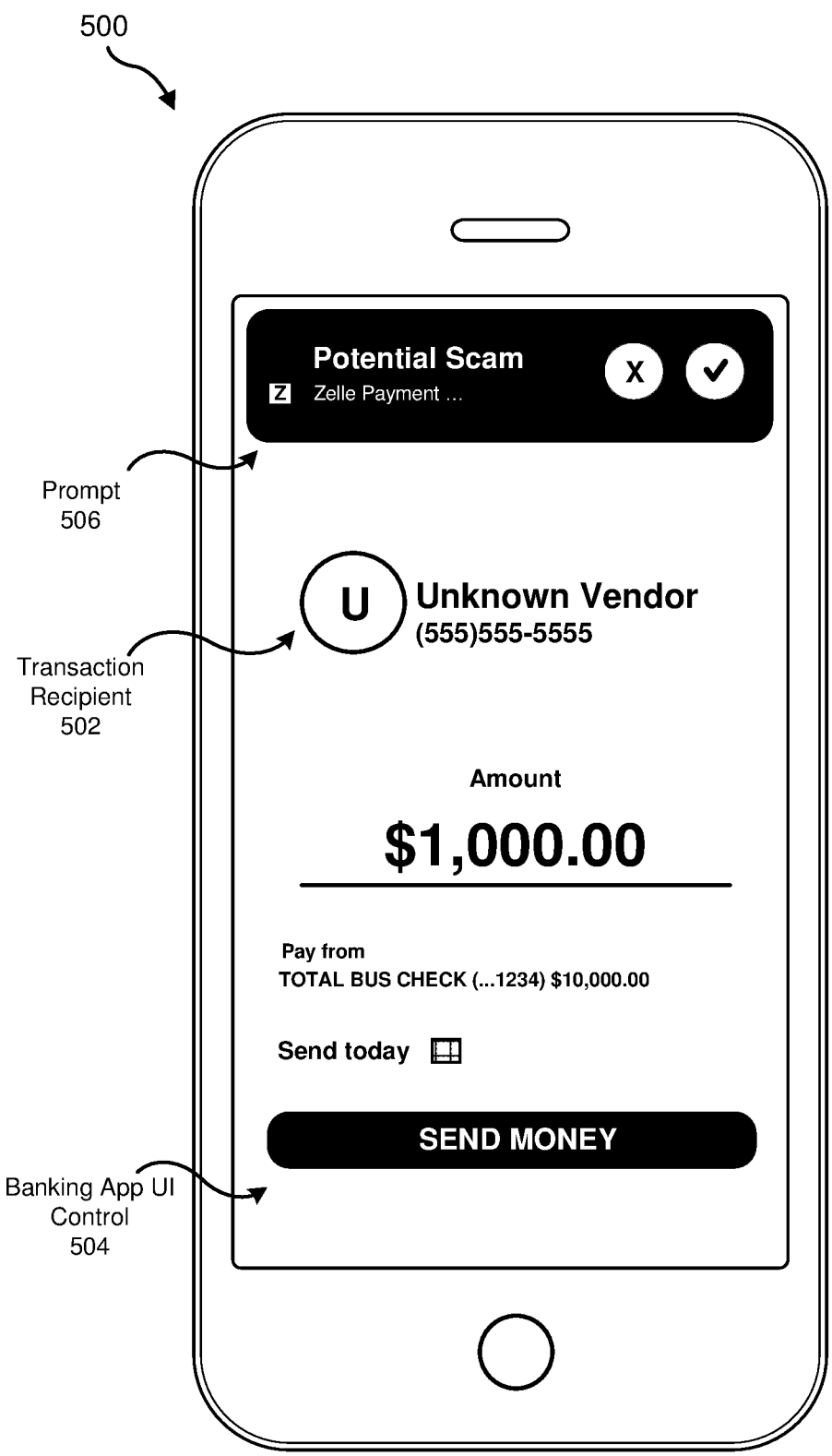
FIG. 5 is a graphical illustration of a mobile device user interface displaying a prompt according to some implementations of the call spam/scam protection using network extensions.

As illustrated in FIG. 5, a computing device 500, in this example a smart phone, has an active display showing a user interface of a banking app in which the user has entered an unknown recipient 502 corresponding to a phone number. The active display also shows display of a banking app user interface control 504 that the user selects to perform a payment transaction by sending an entered amount of money from the user's account to the unknown recipient 502. Once the user has selected the control 504, network traffic for the payment transaction may be intercepted, and the phone number may be matched to a scam phone number in a spam/scam repository, resulting in display of prompt 506 as part of the previously described security action. The prompt 506, which may be displayed by the filter data provider of the content filter, includes a textual message that notifies a user that the outgoing payment transaction is directed to a potential scammer. The prompt 506 also provides labeled controls that prompt the user to make a user selection whether to allow or prevent the payment transaction. The user may select one of these controls by touching the control, and the filter data provider may receive this user selection. Thus, when the user selects to prevent the payment transaction, the content filter may deny a network connection for the payment transaction. Alternatively, if the user selects to allow the payment transaction, then the content filter may allow the network connection for the payment transaction.

As set forth above, the systems and methods provided herein may successfully provide proactive call spam/scam protection using network extensions. Advantageously, the disclosed solution provides this protection in closed platform operating systems, such as iOS, while preventing the calls and extending the protection to messaging app traffic and/or social app traffic. Configuration information provides a spam/scam repository and rules for causing a content filter to intercept network traffic, capture phone numbers of incoming calls in the network traffic, compare the captured numbers to the entries in the scam/spam repository, and abort connections and/or prompt users to take action. As a result of this solution, computing devices having closed platform operating systems are improved by addition of the proactive call spam/scam detection that may prevent calls and extend the protection to messaging apps and/or social apps.

Figure 6:
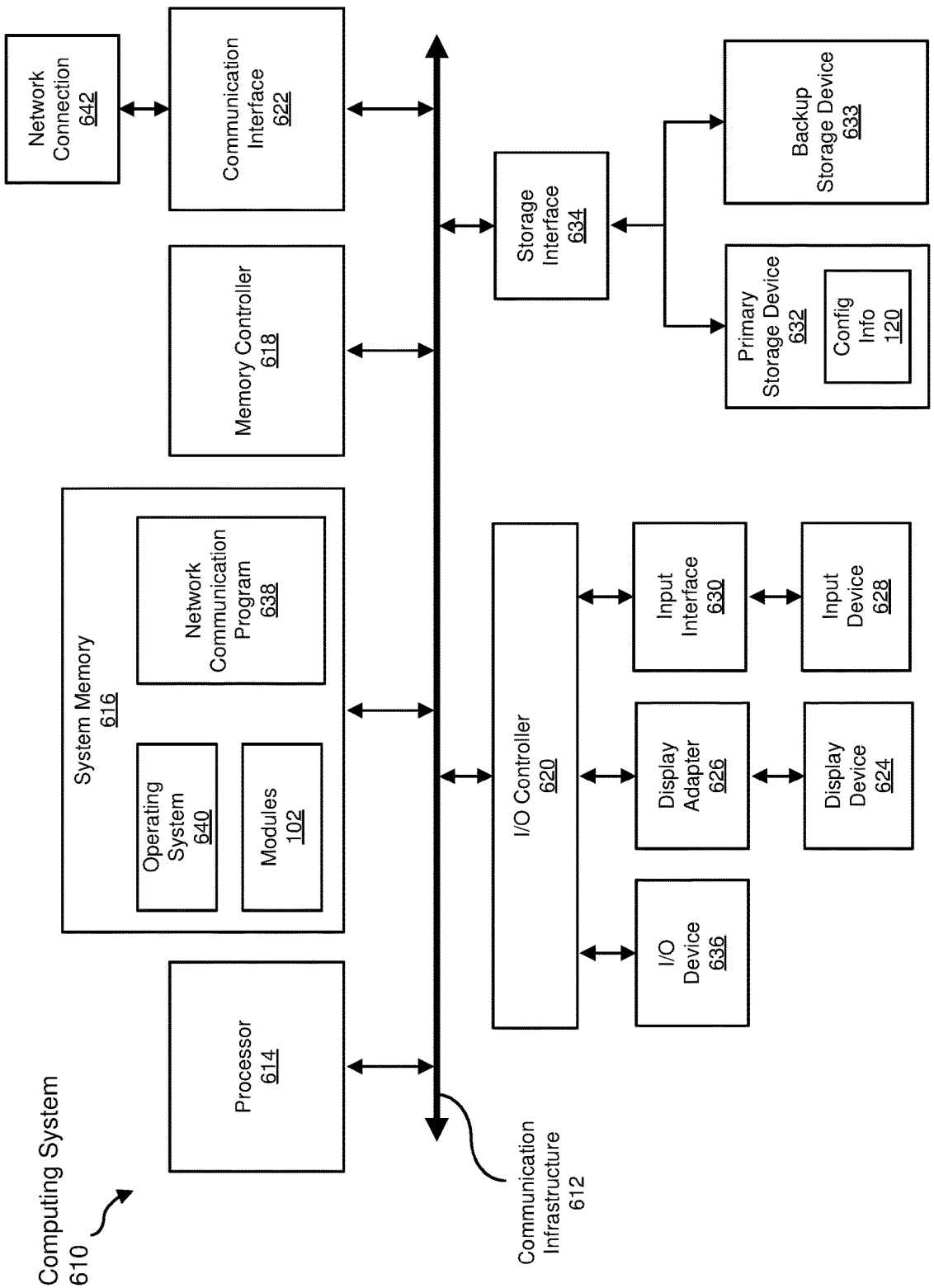
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, configuration information 120] from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
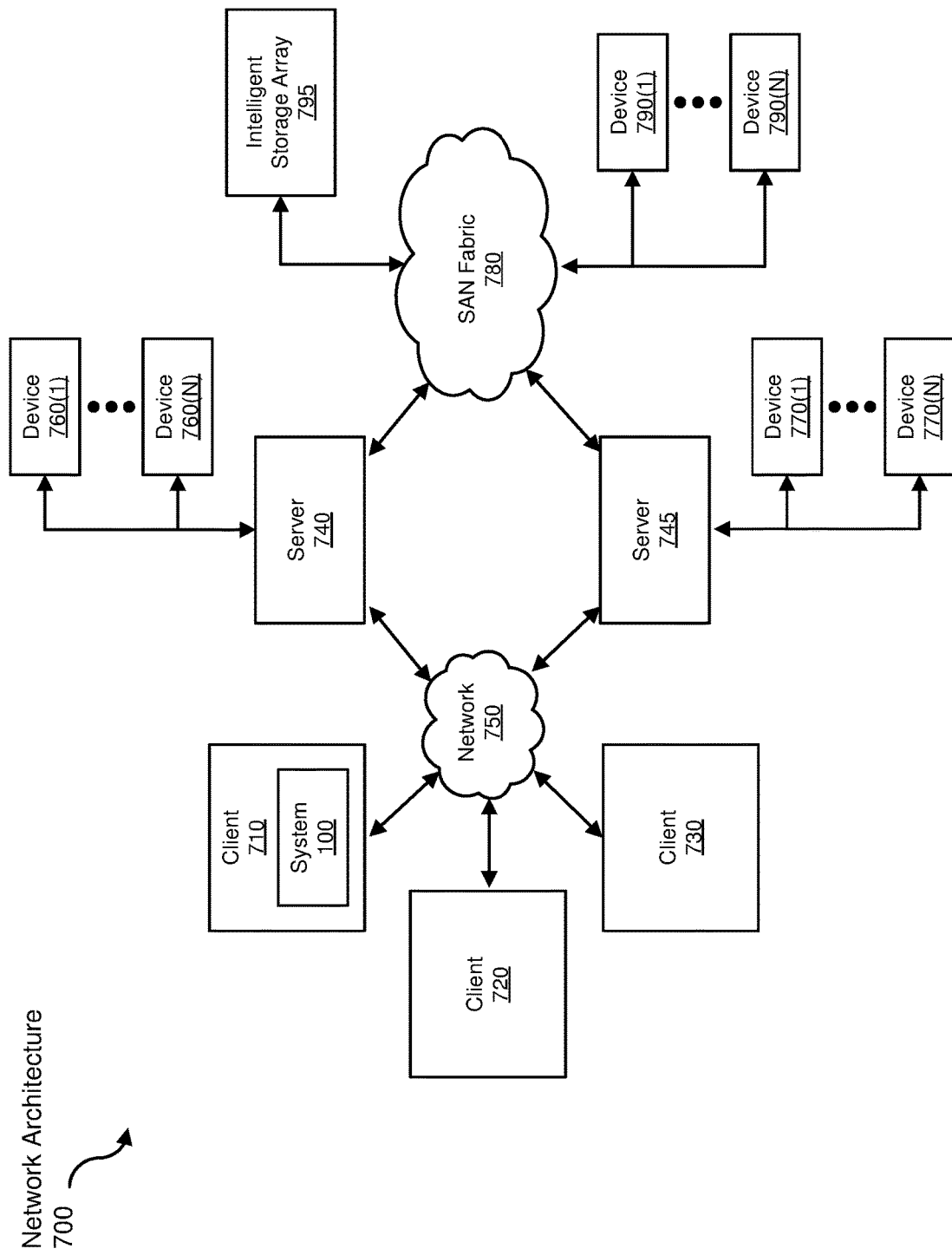
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for proactive call spam/scam protection.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive network traffic to be transformed, transform the network traffic, output a result of the transformation to another of the modules recited herein, and use the result of the transformation to deny or allow network connections. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for proactive call spam/scam protection, at least a portion of the method being performed by a computing device comprising at least one processor, the method comprising:
    intercepting network traffic by the at least one processor employing a network extension feature of an operating system of the computing device;
    capturing, by the at least one processor employing the network extension feature, a phone number in the network traffic;
    comparing, by the at least one processor employing the network extension feature, the phone number to a plurality of entries in a spam/scam repository; and
    performing, by the at least one processor, a security action in response to the comparison.

2. The method of claim 1, wherein capturing the phone number includes capturing the phone number for a payment transaction in the network traffic, and the security action includes preventing the payment transaction.

3. The method of claim 1, wherein capturing the phone number includes capturing the phone number for a call in the network traffic, and the security action includes employing the network extension feature to deny a network connection for the call.

4. The method of claim 1, wherein the network extension feature is implemented using an iOS operating system network extension framework.

5. The method of claim 4, wherein the network extension feature is implemented as a content filter of the iOS network extension framework.

6. The method of claim 5, further comprising receiving, by a filter data provider of the content filter, configuration information that includes the spam/scam repository.

7. The method of claim 1, wherein the security action further includes:
    communicating a prompt to a user of the computing device; and
    receiving a user input indicating a user selection responsive to the prompt,
    wherein performance of the security action occurs in response to the user selection.

8. The method of claim 7, wherein the prompt informs the user that an outgoing payment transaction to the phone number is may be a payment to a scammer and prompts the user to make the user selection to allow or prevent the outgoing payment transaction.

9. The method of claim 7, wherein the prompt informs the user that a call in the network traffic may be a spam or scam call and prompts the user to make the user selection to allow or prevent the call.

10. The method of claim 9, wherein the security action further includes:
    making a determination that the user selection indicates that the user wishes to prevent the call; and
    denying a network connection in response to the determination that the user wishes to prevent the call.

11. The method of claim 1, wherein the network traffic includes at least one of messaging application traffic or social application traffic.

12. A system for proactive call spam/scam protection, the system comprising:
    at least one physical processor employing a network extension feature of an operating system;
    physical memory comprising computer-executable instructions that, when executed by the physical processor, cause the physical processor to:
    intercept network traffic;
    capture a phone number in the network traffic;
    compare the phone number to a plurality of entries in a spam/scam repository; and
    perform a security action in response to the comparison.

13. The system of claim 12, wherein the instructions that cause the physical processor to capture the phone number include instructions that cause the physical processor to capture the phone number for a payment transaction in the network traffic, and the security action includes preventing the payment transaction.

14. The system of claim 12, wherein the instructions that cause the physical processor to capture the phone number include instructions that cause the physical processor to capture the phone number for a call in the network traffic, and the security action includes employing the network extension feature to deny a network connection for the call.

15. The system of claim 12, wherein the network extension feature is implemented using an iOS operating system network extension framework.

16. The system of claim 15, wherein the network extension feature is implemented as a content filter of the iOS network extension framework.

17. The system of claim 16, wherein the instructions further cause the physical processor to receive, by a filter data provider of the content filter, configuration information that includes the spam/scam repository.

18. A non-transitory computer-readable medium comprising one or more computer-executable instructions that, when executed by at least one processor of a computing device, cause the computing device to:

intercept network traffic by the at least one processor employing a network extension feature of an operating system of the computing device;

capture, by the at least one processor employing the network extension feature, a phone number in the network traffic;

compare, by the at least one processor employing the network extension feature, the phone number to a plurality of entries in a spam/scam repository; and perform, by the at least one processor, a security action in response to the comparison.

19. The non-transitory computer-readable medium of claim 18, wherein the instructions that cause the computing device to capture the phone number include instructions that cause the computing device to capture the phone number for a payment transaction in the network traffic, and the security action includes preventing the payment transaction.

20. The non-transitory computer-readable medium of claim 18, wherein the instructions that cause the computing device to capture the phone number include instructions that cause the computing device to capture the phone number for a call in the network traffic, and the security action includes employing the network extension feature to deny a network connection for the call.

\* \* \* \* \*